(12) United States Patent
Dong

(10) Patent No.: US 12,432,809 B2
(45) Date of Patent: Sep. 30, 2025

(54) DATA TRANSMISSION METHOD AND APPARATUS, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 379 days.

(21) Appl. No.: 17/909,257

(22) PCT Filed: Mar. 10, 2020

(86) PCT No.: PCT/CN2020/078660
§ 371 (c)(1),
(2) Date: Sep. 2, 2022

(87) PCT Pub. No.: WO2021/179178
PCT Pub. Date: Sep. 16, 2021

(65) Prior Publication Data
US 2023/0090741 A1 Mar. 23, 2023

(51) Int. Cl.
*H04W 74/08* (2024.01)
*H04W 74/00* (2009.01)
(Continued)

(52) U.S. Cl.
CPC ......... *H04W 76/27* (2018.02); *H04W 74/004* (2013.01); *H04W 74/0833* (2013.01); *H04W 74/0836* (2024.01)

(58) Field of Classification Search
CPC .......... H04W 74/0833; H04W 74/004; H04W 76/27
See application file for complete search history.

(56) References Cited

U.S. PATENT DOCUMENTS

| 10,582,413 B2 | 3/2020 | Babaei et al. |
| 2012/0127930 A1* | 5/2012 | Nguyen ............. H04W 74/002 370/329 |

(Continued)

FOREIGN PATENT DOCUMENTS

| CN | 108282901 A | 7/2018 |
| CN | 109392061 A | 2/2019 |

(Continued)

OTHER PUBLICATIONS

Samsung, Data transfer in inactive state based on 4-step RACH procedures, 3GPP TSG-RAN WG2 #97, R2-1701529, Athens, Greece, Feb. 13-17, 2017, 7 pages.

(Continued)

*Primary Examiner* — Hoang-Chuong Q Vu
(74) *Attorney, Agent, or Firm* — Finnegan, Henderson, Farabow, Garrett & Dunner, L.L.P.

(57) ABSTRACT

A data transmission method is executed by a terminal and includes: during the process of initiating random access to a base station, when there is remaining data to be transmitted in the terminal, sending a random access message to the base station, wherein the random access message contains data amount indication information; and when an uplink grant UL GRANT sent by the base station according to the data amount indication information is received, sending the remaining data to the base station.

17 Claims, 4 Drawing Sheets

---

In a random access procedure to the base station initiated by a terminal in a Radio Resource Control (RRC) inactive state, a random access message sent by the terminal is received — 301

In response to the random access message containing data amount indication information, an uplink grant (UL GRANT) is sent to the terminal according to the data amount indication information, wherein the data amount indication information is used to indicate amount of remaining data to be transmitted in the terminal — 302

The remaining data to be transmitted, sent by the terminal according to the UL GRANT, is received — 303

(51) Int. Cl.
*H04W 74/0833* (2024.01)
*H04W 76/27* (2018.01)
*H04W 74/0836* (2024.01)

(56) References Cited

U.S. PATENT DOCUMENTS

| | | | | |
|---|---|---|---|---|
| 2013/0308545 | A1* | 11/2013 | Lee | H04W 76/10 |
| | | | | 370/328 |
| 2015/0282213 | A1* | 10/2015 | Sun | H04W 74/0833 |
| | | | | 370/329 |
| 2016/0150564 | A1* | 5/2016 | Quan | H04W 72/20 |
| | | | | 370/329 |
| 2016/0285775 | A1* | 9/2016 | Damnjanovic | H04L 47/30 |
| 2019/0364605 | A1* | 11/2019 | Loehr | H04W 72/56 |
| 2019/0387548 | A1* | 12/2019 | Kim | H04W 72/20 |
| 2020/0022134 | A1* | 1/2020 | Ohta | H04W 72/51 |
| 2020/0037345 | A1* | 1/2020 | Ryoo | H04W 74/0833 |
| 2020/0154487 | A1* | 5/2020 | Shrivastava | H04W 72/23 |
| 2020/0196349 | A1* | 6/2020 | He | H04W 72/1268 |
| 2021/0227586 | A1* | 7/2021 | Huang | H04W 52/242 |
| 2022/0167433 | A1* | 5/2022 | Tirronen | H04W 74/0841 |

FOREIGN PATENT DOCUMENTS

| | | |
|---|---|---|
| CN | 104737614 B | 4/2019 |
| CN | 109982440 A | 7/2019 |
| CN | 110139365 A | 8/2019 |
| KR | 20090014937 A | 2/2009 |

OTHER PUBLICATIONS

Samsung, Overall procedure for data transfer in inactive state, 3GPP TSG-RAN WG2 Meeting #6 R2-168051, Reno, USA, Nov. 14-18, 2016, 6 pages.

International Search Report of International Application No. PCT/CN2020/078660, mailed Dec. 15, 2020, 2 pages.

The First Office Action in Chinese Application No. 202080000542.2, dated Mar. 5, 2024, 12 pages.

* cited by examiner

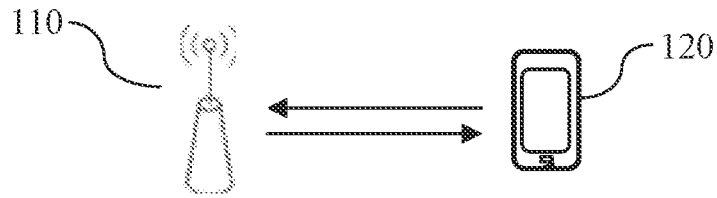

FIG. 1

| In a random access procedure to a base station initiated by the terminal in a Radio Resource Control (RRC) inactive state, a random access message is sent to the base station in response to presence of remaining data to be transmitted in the terminal, wherein the random access message contains data amount indication information | 201 |

| The remaining data to be transmitted is sent to the base station, in response to an uplink grant (UL GRANT), sent by the base station according to the data amount indication information, being received | 202 |

FIG. 2

| In a random access procedure to the base station initiated by a terminal in a Radio Resource Control (RRC) inactive state, a random access message sent by the terminal is received | 301 |

| In response to the random access message containing data amount indication information, an uplink grant (UL GRANT) is sent to the terminal according to the data amount indication information, wherein the data amount indication information is used to indicate amount of remaining data to be transmitted in the terminal | 302 |

| The remaining data to be transmitted, sent by the terminal according to the UL GRANT, is received | 303 |

FIG. 3

DATA TRANSMISSION METHOD AND APPARATUS, AND STORAGE MEDIUM

CROSS REFERENCE TO RELATED APPLICATIONS

The present disclosure is a U.S. national phase application of International Application No. PCT/CN2020/078660 filed on Mar. 10, 2020, which is incorporated herein by reference in its entirety.

TECHNICAL FIELD

The present disclosure relates to the field of wireless communication technology, and in particular, to a data transmission method, an apparatus, and a storage medium.

BACKGROUND

In wireless communication technology, when accessing a network, a terminal needs to establish a Radio Resource Control (RRC) connection with a base station. The terminal can switch from an RRC_IDLE state or an RRC_INACTIVE state to an RRC_CONNECTED state, and perform data transmission according to radio resource allocation.

SUMMARY

Embodiments of the present disclosure provide a data transmission method, a data transmission apparatus and a storage medium, solutions of which are described as follows.

According to one aspect of embodiments of the present disclosure, a data transmission method is provided, the method is executed by a terminal, and the method includes: sending, in a random access procedure to a base station initiated by the terminal in a Radio Resource Control (RRC) inactive state, a random access message to the base station in response to presence of remaining data to be transmitted in the terminal, wherein the random access message contains data amount indication information; and sending the remaining data to be transmitted to the base station in response to receiving an uplink grant (UL GRANT) sent by the base station according to the data amount indication information.

According to another aspect of embodiments of the present disclosure, a data transmission method is provided, the method is executed by a base station, and the method includes: receiving, in a random access procedure to the base station initiated by a terminal in a Radio Resource Control (RRC) inactive state, a random access message sent by the terminal; sending, in response to the random access message containing data amount indication information, an uplink grant (UL GRANT) to the terminal according to the data amount indication information, wherein the data amount indication information is used to indicate amount of remaining data to be transmitted in the terminal; and receiving the remaining data to be transmitted sent by the terminal according to the UL GRANT.

According to another aspect of embodiments of the present disclosure, a data transmission apparatus is provided, the apparatus is applied in a terminal, and the apparatus includes: a message sending module configured to send, in a random access procedure to a base station initiated by the terminal in a Radio Resource Control (RRC) inactive state, a random access message to the base station in response to presence of remaining data to be transmitted in the terminal, wherein the random access message contains data amount indication information; and a data sending module configured to send the remaining data to be transmitted to the base station in response to receiving an uplink grant (UL GRANT) sent by the base station according to the data amount indication information.

According to another aspect of embodiments of the present disclosure, a data transmission apparatus is provided, the apparatus is applied in a base station, and the apparatus includes: a message receiving module configured to receive, in a random access procedure to the base station initiated by a terminal in a Radio Resource Control (RRC) inactive state, a random access message sent by the terminal; a grant sending module configured to send, in response to the random access message containing data amount indication information, an uplink grant (UL GRANT) to the terminal according to the data amount indication information, wherein the data amount indication information is used to indicate amount of remaining data to be transmitted in the terminal; and a data receiving module configured to receive the remaining data to be transmitted sent by the terminal according to the UL GRANT.

According to another aspect of embodiments of the present disclosure, a data transmission apparatus is provided, the apparatus is applied in a terminal, and the apparatus includes: a processor; and a memory for storing instructions executable by the processor; wherein the processor is configured to: send, in a random access procedure to a base station initiated by the terminal in a Radio Resource Control (RRC) inactive state, a random access message to the base station in response to presence of remaining data to be transmitted in the terminal, wherein the random access message contains data amount indication information; and send the remaining data to be transmitted to the base station in response to receiving an uplink grant (UL GRANT) sent by the base station according to the data amount indication information.

According to another aspect of embodiments of the present disclosure, a data transmission apparatus is provided, the apparatus is applied in a base station, and the apparatus includes: a processor; and a memory for storing instructions executable by the processor; wherein the processor is configured to: receive, in a random access procedure to the base station initiated by a terminal in a Radio Resource Control (RRC) inactive state, a random access message sent by the terminal; send, in response to the random access message containing data amount indication information, an uplink grant (UL GRANT) to the terminal according to the data amount indication information, wherein the data amount indication information is used to indicate amount of remaining data to be transmitted in the terminal; and receive the remaining data to be transmitted sent by the terminal according to the UL GRANT.

According to another aspect of embodiments of the present disclosure, a computer-readable storage medium containing executable instructions, which when invoked and executed by a processor in a terminal, cause the data transmission method according to any of above aspects to be implemented.

According to another aspect of embodiments of the present disclosure, a computer-readable storage medium containing executable instructions, which when invoked and executed by a processor in a base station, cause the data transmission method according to any of above aspects to be implemented.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

It should be understood that the foregoing general description and the following detailed description are exemplary only and do not limit the present disclosure.

BRIEF DESCRIPTION OF THE DRAWINGS

In order to explain technical solutions in embodiments of the present disclosure more clearly, drawings that need to be used in the description of embodiments will be briefly introduced in the following. It is apparent that the drawings are only some embodiments of the present disclosure. For those of ordinary skill in the art, other drawings can also be obtained from these drawings without creative efforts.

FIG. 1 is a schematic diagram of a data transmission system according to an embodiment of the present disclosure;

FIG. 2 is a flowchart of a data transmission method for sending data according to an embodiment of the present disclosure;

FIG. 3 is a flowchart of a data transmission method for receiving data according to an embodiment of the present disclosure;

DETAILED DESCRIPTION

Figure 4:
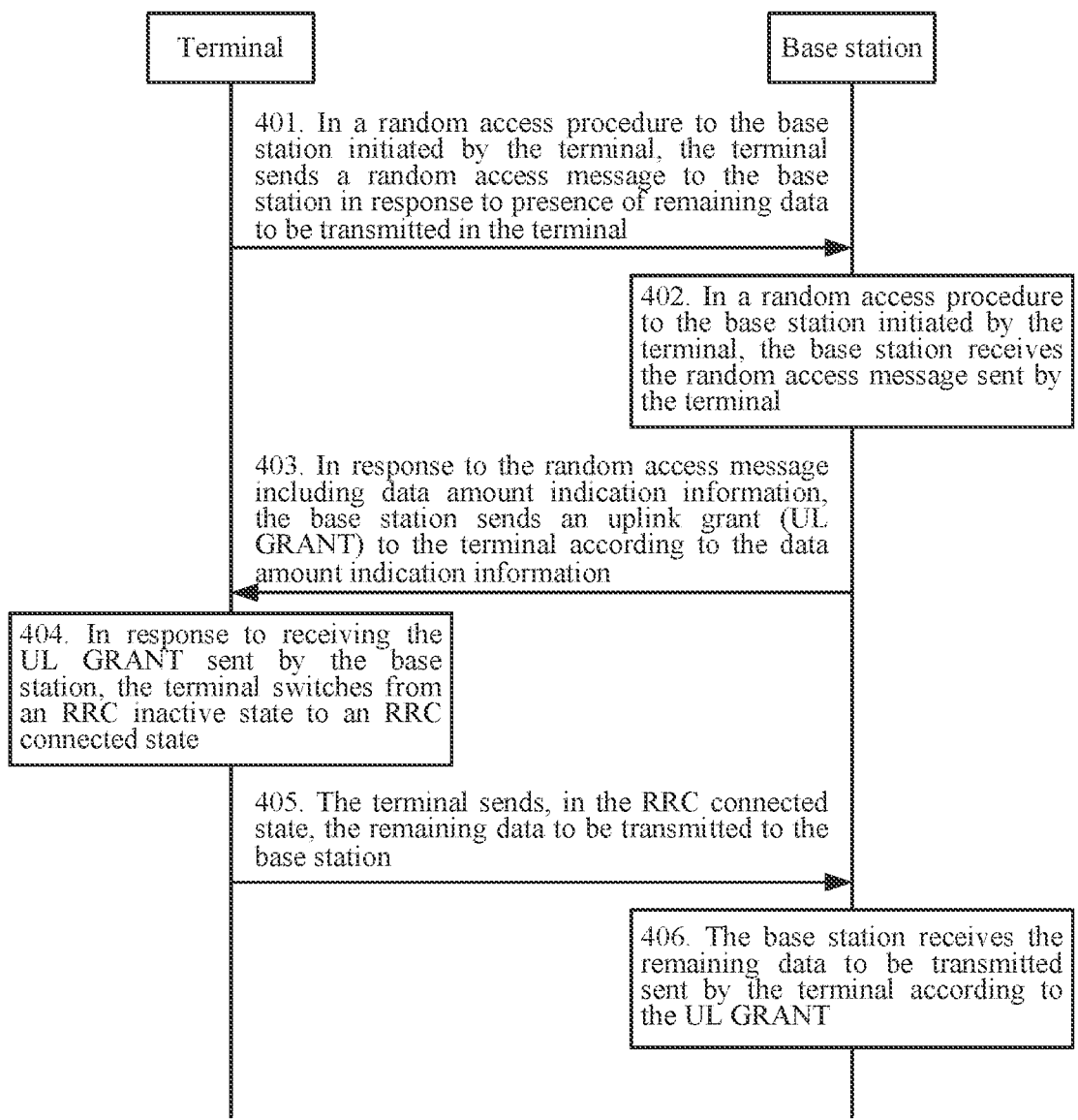
FIG. 4 is a flowchart of a data transmission method according to an embodiment of the present disclosure.

Exemplary embodiments will be described in detail herein, examples of which are illustrated in the drawings. When the following description refers to the drawings, the same numerals in different drawings indicate the same or similar elements unless otherwise noted. Implementations described in the illustrative examples below are not intended to represent all implementations consistent with the present disclosure. Rather, they are merely examples of apparatus and methods consistent with some aspects of the present disclosure as recited in the appended claims.

It should be understood that reference to "several" herein refers to one or multiple, and "multiple" refers to two or more than two. "And/or" describes an association relationship of associated objects, and means that there can be three kinds of relationships. For example, A and/or B, means that there is only A, there are both A and B, and there is only B. A character "/" generally indicates that the associated objects are in an "or" relationship.

For convenience of understanding, terms involved in embodiments of the present disclosure are described below.
1) Radio Resource Control (RRC)

RRC handles Layer 3 information of a control plane between a terminal and a radio access network. RRC is mainly used to establish a signaling link between the terminal and the radio access network, and to allocate and manage radio resources.

To communicate with the radio access network, the terminal needs to establish an RRC link first, and then transmit signaling of non-access layers.

The terminal, currently, switches from an RRC_IDLE (Radio Resource Control Idle) state or an RRC INACTIVE (Radio Resource Control Inactive) state to an RRC CONNECTED (Radio Resource Control Connected) state, and then sends data, which requires a lot of signaling overhead.
2) Buffer Status Report (BSR)

Buffer Status Report is used to provide a base station with information about there is how much data in an uplink buffer in the terminal that needs to be sent. BSR is divided into regular BSR, padding BSR and periodic BSR, which are explained as follows:

the regular BSR: in a case where the base station has not allocated uplink resources, if a logical channel belonging to a certain logical channel group has data to be sent, the regular BSR needs to be triggered.

the padding BSR: in a case where the base station has allocated uplink resources and the number of padding bits is greater than or equal to BSR control information plus a subheader thereof, the padding BSR is triggered.

the periodic BSR: when a periodic BSR-Timer expires, the BSR triggered is known as the periodic BSR.
3) Logic Channel Group (LCG)

The terminal can establish a large number of radio bearers, and each bearer corresponds to a logical channel. A lot of signaling overhead will be resulted if one Buffer Status Report (BSR) is reported for every one logical channel. To avoid such overhead, the concept of LCG is introduced in LTE and the logical channel is put into one LCG (4 in total). Instead of reporting one BSR for every one logical channel, the terminal reports the BSR based on the LCG.

Reference is made to FIG. 1, which shows a schematic diagram of a data transmission system according to an embodiment of the present disclosure. As shown in FIG. 1, the data transmission system may include a base station 110 and a terminal 120.

The terminal 120 may be a wireless communication device that supports multiple wireless access technologies for data transmission. The terminal 120 may communicate with one or more core networks via a Radio Access Network (RAN). The terminal 120 may be an IoT terminal such as a sensor device, a mobile phone (or known as a "cellular" phone), and a computer with the IoT terminal, such as stationary, portable, pocket-sized, hand-held, computer-built-in or vehicle-mounted devices. For example, a station (STA), a subscriber unit, a subscriber station, a mobile station, a mobile, a remote station, an access point, a remote terminal, an access terminal, a user terminal, a user agent, a user device, or user equipment (UE). Alternatively, the terminal 120 may also be a device of an unmanned aerial vehicle.

The base station 110 may be a network-side device in a wireless communication system. The wireless communication system may be a 5G system, which is also known as a New Radio (NR) system. Alternatively, the wireless communication system may also be a next-generation system following the 5G system.

The base station 110 may be a base station (gNB) that adopts a centralized-distributed architecture in the 5G system. In a case where the centralized-distributed architecture is adopted, the base station 110 usually includes a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer. The distributed unit is provided with a physical (PHY) layer protocol stack. Specific implementations of the base station 110 is not limited in embodiments of the present disclosure.

A wireless connection can be established between the base station 110 and the terminal 120 via a wireless air interface. In different embodiments, the wireless air interface is a wireless air interface based on the $5^{th}$ Generation Mobile Communication Technology (5G) standard. For example, the wireless air interface is a new radio, or the wireless air interface can also be a wireless air interface of next-generation mobile communication technology standard based on 5G.

Some embodiments of the present disclosure provide a data transmission method. Reference is made to FIG. 2, which shows a flowchart of a data transmission method for sending data according to an embodiment of the present disclosure. The data transmission method can be applied to the data transmission system shown in FIG. 1, and executed by the terminal in FIG. 1. The method may include following steps.

In a step 201, in a random access procedure to a base station initiated by the terminal in a Radio Resource Control (RRC) inactive state, a random access message is sent to the base station in response to presence of remaining data to be transmitted in the terminal. The random access message contains data amount indication information.

In a step 202, the remaining data to be transmitted is sent to the base station, in response to an uplink grant (UL GRANT), sent by the base station according to the data amount indication information, being received.

In some embodiments, an upper limit of a minimum data amount interval indicated by the data amount indication information is less than 10 bytes.

In some embodiments, difference between upper limits of two adjacent data amount intervals among data amount intervals indicated by the data amount indication information is less than or equal to 10 bits.

In some embodiments, the data amount indication information is indicated by a buffer size field in a Buffer Status Report (BSR) in the random access message, In some embodiments, the data amount indication information is indicated by a Media Access Control layer protocol data unit (MAC PDU) in the random access message.

In some embodiments, the data amount indication information is indicated by an R bit in a header of the MAC PDU.

In some embodiments, the random access message includes Msg3 in 4-step random access or MsgA PUSCH in 2-step random access.

In some embodiments, the Msg3 in the 4-step random access or the MsgA PUSCH in the 2-step random access includes a terminal identity UE ID.

Herein, the MsgA is composed of the random access code preamble and the MsgA PUSCH.

Further, the Msg3 or the MsgA PUSCH may be an RRC Resume request message.

In some embodiments, the data amount indication information is further used to indicate that the terminal is to switch to a Radio Resource Control (RRC) connected state.

Where in response to an uplink grant (UL GRANT), sent by the base station according to the data amount indication information, being received, the remaining data to be transmitted is sent to the base station, includes following steps:
  in response to the UL GRANT sent by the base station being received, switching is performed from the RRC inactive state to the RRC connected state; and
  the remaining data to be transmitted is sent to the base station in the RRC connected state.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

Some embodiments of the present disclosure provide a data transmission method. Reference is made to FIG. 3, which shows a flowchart of a data transmission method for receiving data according to an embodiment of the present disclosure. The data transmission method can be applied to the data transmission system shown in FIG. 1, and executed by the base station in FIG. 1. The method may include following steps.

In a step 301, in a random access procedure to the base station initiated by a terminal in a Radio Resource Control (RRC) inactive state, a random access message sent by the terminal is received.

In a step 302, in response to the random access message containing data amount indication information, an uplink grant (UL GRANT) is sent to the terminal according to the data amount indication information. The data amount indication information is used to indicate amount of remaining data to be transmitted in the terminal.

In a step 303, the remaining data to be transmitted, sent by the terminal according to the UL GRANT, is received.

In some embodiments, an upper limit of a minimum data amount interval indicated by the data amount indication information is less than 10 bytes.

In some embodiments, difference between upper limits of two adjacent data amount intervals among data amount intervals indicated by the data amount indication information is less than or equal to 10 bits.

In some embodiments, the data amount indication information is indicated by a buffer size field in a Buffer Status Report (BSR) in the random access message.

In some embodiments, the data amount indication information is indicated by a Media Access Control layer protocol data unit (MAC PDU) in the random access message.

In some embodiments, the data amount indication information is indicated by an R bit in a header of the MAC PDU.

In some embodiments, the random access message includes Msg3 in 4-step random access or MsgA PUSCH in 2-step random access.

In some embodiments, the Msg3 in the 4-step random access or the MsgA PUSCH in the 2-step random access includes a terminal identity UE ID. Herein, the UE ID is I-RNTI, which occupies 40 bits or 24 bits.

In some embodiments, the data amount indication information is further used to indicate that the terminal is to switch to a Radio Resource Control (RRC) connected state.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

Reference is made to FIG. 4, which shows a flowchart of a data transmission method according to an embodiment of the present disclosure. The data transmission method can be applied to the data transmission system shown in FIG. 1, and executed interactively between the terminal and the base station in FIG. 1. The method may include following steps.

In a step 401, in a random access procedure to the base station initiated by the terminal, the terminal sends a random access message to the base station in response to presence of remaining data to be transmitted in the terminal.

In some embodiments of the present disclosure, when the data to be transmitted by the terminal is uplink small data, in response to presence of the remaining data to be transmitted in the terminal, the terminal can send, in an inactive state RRC_INACTIVE, to the base station a random access message via a Physical Uplink Shared Channel (PUSCH).

In some embodiments, when being in the inactive state RRC INACTIVE, the terminal can directly transmit limited bytes of data to the base station in the random access procedure to the base station initiated by the terminal.

In some embodiments, the random access message includes Msg3 in 4-step random access or MsgA PUSCH in 2-step random access. The Msg3 in the 4-step random access or the MsgA PUSCH in the 2-step random access may include RRC re-request frames.

For example, the terminal can transmit the uplink small data by means of MsgA PUSCH. The limited bytes for Msg3 or MsgA PUSCH in existing standards are 56 or 72 bits, and the terminal can directly transmit to the base station data with 56 or 72 bits. When the UE in the RRC INACTIVE state adopts 4-step random access or 2-step random access, transmitted data may exceed 56 or 72 bits, but it will not exceed too much, for example, a maximum of 15 bytes. When a size of the small data exceeds 56 or 72 bits, the Msg3 or MsgA PUSCH can be transmitted in the form of small data plus BSR, and the remaining small data can be identified by BSR.

In some embodiments, the random access message can contain data amount indication information.

In some embodiments, an upper limit of a minimum data amount interval that can be indicated by the data amount indication information is less than 10 bytes.

In some embodiments, the data amount indication information is indicated by a buffer size field in the Buffer Status Report (BSR) in the random access message, In some embodiments, difference between upper limits of two adjacent data amount intervals among data amount intervals indicated by the data amount indication information is less than or equal to 10 bits.

Figure 5:
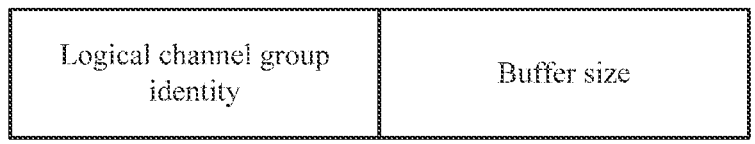
FIG. 5 is a schematic diagram of a BSR format involved in the embodiment shown in FIG. 4.

For example, reference is made to FIG. 5, which shows a schematic diagram of a BSR format involved in embodiments of the present disclosure. As shown in FIG. 5, the BSR format may be composed of a logical channel group identity field and a buffer size field.

In some embodiments, the logical channel group identity field may occupy 3 bits, and the BSR may occupy 4 bits or 1 byte.

In some embodiments, in a case where 1 bit is used for the buffer size field, when there is remaining uplink small data that has not been transmitted in the buffer, an identification can be set in the buffer size field.

In some embodiments, in a case where 5 bits are used for the buffer size field, a corresponding relationship between the identification set in the buffer size field and the size of buffered data may be as shown in Table 1. The terminal determines in which data amount range the uplink small data will fall, and sets corresponding identification in the BSR according to determined range the uplink small data belongs to.

TABLE 1

| Identification (Index) | BS size |
| --- | --- |
| 0 | <10 bits |
| 1 | [10 bits, 20 bits] |
| 2 | (20 bits, 30 bits] |
| 3 | (30 bits, 40 bits] |
| 4 | (40 bits, 50 bits] |
| . . . | . . . |

In some embodiments, the terminal encapsulates the identity corresponding to the terminal, part of uplink small data that can be directly transmitted, and BSR into the random access message, and sends the random access message to the base station via the Physical Uplink Shared Channel.

For example, the identity of the terminal may be I-RNTI, occupying 40 bits or 24 bits.

In some embodiments, the data amount indication information may be indicated by a Media Access Control layer protocol data unit (MAC PDU) in the random access message.

In some embodiments, in a case where the data amount indication information in the random access message is indicated by the MAC layer protocol data unit, the terminal determines, according to the data amount range of the uplink small data configured in the RANI which is responsible for specification of the physical layer of the radio interface, amount of remaining uplink small data in the uplink small data, as the remaining data.

In some embodiments, the data amount indication information is indicated by an R bit in a header of the MAC PDU.

Figure 6:
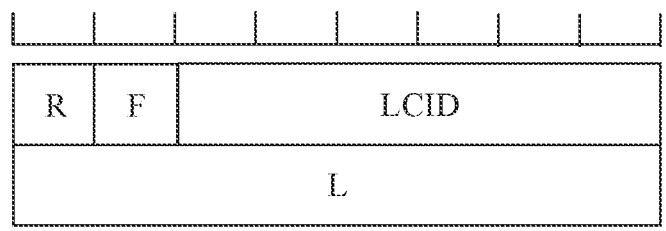
FIG. 6 is a schematic diagram of a MAC subheader structure involved in the embodiment shown in FIG. 4.

For example, reference is made to FIG. 6, which shows a schematic diagram of a MAC subheader structure involved in an embodiment of the present disclosure. As shown in FIG. 6, the MAC subheader structure may be composed of an R field, an F field, an L field and an LCID field. The MAC subheader may occupy 8 bits in total, and the R field may occupy 1 bit.

In some embodiments, in a case where the data amount indication information in the random access message is indicated by the MAC layer protocol data unit, the terminal can encapsulate identity information of the terminal and part of the uplink small data that can be directly transmitted into a random access message through the MAC layer protocol data unit carrying the data amount indication information, and send the random access message to the base station.

In some embodiments, the data amount indication information can also be used to indicate that the terminal is to switch to a Radio Resource Control (RRC) connected state.

In a step 402, in a random access procedure to the base station initiated by the terminal in a Radio Resource Control (RRC) inactive state, the base station receives the random access message sent by the terminal.

In some embodiments, the base station can receive the random access message sent by the terminal, and decode and identify the random access message.

In some embodiments, the base station can obtain the identity of the terminal, part of the data transmitted to the base station by the terminal, and the data amount indication information possibly contained.

In some embodiments, the data amount indication information enables the base station to obtain corresponding radio resources according to the identification in the data amount indication information.

For example, in a case where the data amount indication information in the random access message is encapsulated in the BSR, it is determined, according to the BSR format, that when the identification in the buffer size field is 1, the buffer size is between 10 bits and 20 bits, as shown in Table 1. In some embodiments, the base station can allocate corresponding radio resources according to a maximum of the buffer size. That is, the base station can allocate corresponding radio resources according to radio resources required for transmitting 20 bits of data.

In a step 403, in response to the random access message including data amount indication information, the base station sends an uplink grant (UL GRANT) to the terminal according to the data amount indication information.

In some embodiments, the base station can obtain radio resources required based on analysis and decoding of the identification information in the random access message, and allocate obtained radio resources required to a corresponding terminal by sending an uplink grant to the terminal corresponding to the identity of the terminal.

In some embodiments, the data amount indication information can be used to indicate amount of the remaining data to be transmitted in the terminal. An upper limit of a minimum data amount interval indicated by the data amount indication information is less than 10 bytes.

In some embodiments, the uplink grant (UL GRANT) is physical control information used to notify the terminal that data transmission can be performed.

For example, after receiving the uplink grant (UL GRANT), the terminal can, after 4 ms (i.e., after 4 subframes), use allocated radio resources for data transmission.

In some embodiments, radio resources required by the terminal may be slightly larger than a maximum of radio resources required for data amount corresponding to the buffer size indicated in the data amount indication information.

In some embodiments, in a case where 1 bit is used for the buffer size field, an identification is set to indicate that there is remaining small data that has not been transmitted, and the base station shall allocate and send the UL GRANT to the terminal according to maximum difference.

In a step 404, in response to receiving the UL GRANT sent by the base station, the terminal switches from an RRC inactive state to an RRC connected state.

In some embodiments, after receiving the uplink grant sent by the base station, the terminal can switch from the RRC inactive state to the RRC connected state.

In some embodiments, when the terminal receives the uplink grant (UL GRANT) sent by the base station, the terminal can switch from the inactive state RRC INACTIVE to the connected state RRC_CONNECTED, and transmit the remaining uplink small data according to received radio resource allocation.

In a step 405, the terminal sends, in the RRC connected state, the remaining data to be transmitted to the base station.

In a step 406, the base station receives the remaining data to be transmitted sent by the terminal according to the uplink grant (UL GRANT).

In some embodiments, the base station can receive the remaining data in the buffer of the terminal sent by the terminal.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

Apparatus provided in embodiments of the present disclosure, which can be used to execute method provided in embodiments of the present disclosure, will be described in the following. For details not disclosed in apparatus embodiments of the present disclosure, please refer to corresponding method embodiments of the present disclosure.

Figure 7:
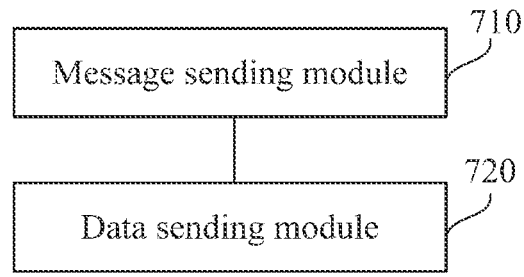
FIG. 7 is a block diagram of a data transmission apparatus for sending data according to an embodiment of the present disclosure.

FIG. 7 is a block diagram of a data transmission apparatus for sending data according to an embodiment of the present disclosure. As shown in FIG. 7, the data transmission apparatus can be implemented, through hardware or a combination of software and hardware, as the terminal or a part thereof in the data transmission system shown in FIG. 1, to execute steps executed by the terminal in any of embodiments shown in FIG. 2 or FIG. 4. The data transmission apparatus may include a message sending module 710 and a data sending module 720.

The message sending module 710 is configured to send, in a random access procedure to a base station initiated by the terminal in a Radio Resource Control (RRC) inactive state, a random access message to the base station in response to presence of remaining data to be transmitted in the terminal, wherein the random access message contains data amount indication information.

The data sending module 720 is configured to send the remaining data to be transmitted to the base station in response to receiving an uplink grant (UL GRANT) sent by the base station according to the data amount indication information.

In some embodiments, an upper limit of a minimum data amount interval indicated by the data amount indication information is less than 10 bytes.

In some embodiments, difference between upper limits of two adjacent data amount intervals among data amount intervals indicated by the data amount indication information is less than or equal to 10 bits.

In some embodiments, the data amount indication information is indicated by a buffer size field in a Buffer Status Report (BSR) in the random access message.

In some embodiments, the data amount indication information is indicated by a Media Access Control layer protocol data unit (MAC PDU) in the random access message.

In some embodiments, the data amount indication information is indicated by an R bit in a header of the MAC PDU.

In some embodiments, the random access message includes Msg3 in 4-step random access or MsgA PUSCH in 2-step random access.

In some embodiments, the Msg3 in the 4-step random access or the MsgA PUSCH in the 2-step random access includes a terminal identity UE ID.

In some embodiments, the data amount indication information is further used to indicate that the terminal is to switch to a Radio Resource Control (RRC) connected state.

In some embodiments, the data sending module 720 includes a state switching submodule and a data sending submodule.

The state switching submodule is configured to switch from the RRC inactive state to the RRC connected state in response to receiving the UL GRANT sent by the base station.

The data sending submodule is configured to send, in the RRC connected state, the remaining data to be transmitted to the base station.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

Figure 8:
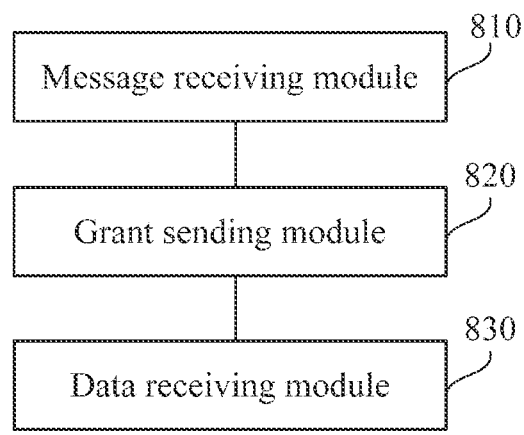
FIG. 8 is a block diagram of a data transmission apparatus for receiving data according to an embodiment of the present disclosure.

FIG. 8 is a block diagram of a data transmission apparatus for receiving data according to an embodiment of the present disclosure. As shown in FIG. 8, the data transmission apparatus can be implemented, through hardware or a combination of software and hardware, as the base station or a part thereof in the data transmission system shown in FIG. 1, to execute steps executed by the base station in any of embodiments shown in FIG. 3 or FIG. 4. The data transmission apparatus may include a message receiving module 810, a grant sending module 820 and a data receiving module 830.

The message receiving module 810 is configured to receive, in a random access procedure to the base station initiated by a terminal in a Radio Resource Control (RRC) inactive state, a random access message sent by the terminal.

The grant sending module 820 is configured to send, in response to the random access message containing data amount indication information, an uplink grant (UL GRANT) to the terminal according to the data amount indication information, wherein the data amount indication information is used to indicate amount of remaining data to be transmitted in the terminal.

The data receiving module 830 is configured to receive the remaining data to be transmitted sent by the terminal according to the uplink grant (UL GRANT).

In some embodiments, an upper limit of a minimum data amount interval indicated by the data amount indication information is less than 10 bytes.

In some embodiments, difference between upper limits of two adjacent data amount intervals among data amount intervals indicated by the data amount indication information is less than or equal to 10 bits.

In some embodiments, the data amount indication information is indicated by a buffer size field in a Buffer Status Report (BSR) in the random access message.

In some embodiments, the data amount indication information is indicated by a Media Access Control layer protocol data unit (MAC PDU) in the random access message.

In some embodiments, the data amount indication information is indicated by an R bit in a header of the MAC PDU.

In some embodiments, the random access message includes Msg3 in 4-step random access or MsgA PUSCH in 2-step random access.

In some embodiments, the Msg3 in the 4-step random access or the MsgA PUSCH in the 2-step random access includes a terminal identity UE ID.

In some embodiments, the data amount indication information is further used to indicate that the terminal is to switch to a Radio Resource Control (RRC) connected state.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

It should be noted that, when the apparatus provided in above embodiments realizes its functions, the division of above functional modules is used as an example for illustration only. In practical applications, functions of the apparatus can be divided into different functional modules according to actual needs. That is, the internal structure of the apparatus is divided into different functional modules to complete all or part of the functions described above.

Specific ways in which each module, in the apparatus provided in above embodiments, performs operations has been described in detail in related method embodiments, and will not be described in detail here.

Exemplary embodiments of the present disclosure provide a data transmission apparatus, which can implement all or part of steps executed by the terminal in embodiments shown in FIG. 2 or FIG. 4. The data transmission apparatus includes a processor, and a memory for storing instructions executable by the processor.

In some embodiments, the processor is configured to:
  send, in a random access procedure to a base station initiated by the terminal in a Radio Resource Control (RRC) inactive state, a random access message to the base station in response to presence of remaining data to be transmitted in the terminal, wherein the random access message contains data amount indication information; and
  send the remaining data to be transmitted to the base station in response to receiving an uplink grant (UL GRANT) sent by the base station according to the data amount indication information.

In some embodiments, an upper limit of a minimum data amount interval indicated by the data amount indication information is less than 10 bytes.

In some embodiments, difference between upper limits of two adjacent data amount intervals among data amount intervals indicated by the data amount indication information is less than or equal to 10 bits.

In some embodiments, the data amount indication information is indicated by a buffer size field in a Buffer Status Report (BSR) in the random access message.

In some embodiments, the data amount indication information is indicated by a Media Access Control layer protocol data unit (MAC PDU) in the random access message.

In some embodiments, the data amount indication information is indicated by an R bit in a header of the MAC PDU.

In some embodiments, the random access message includes Msg3 in 4-step random access or MsgA PUSCH in 2-step random access.

In some embodiments, the Msg3 in the 4-step random access or the MsgA PUSCH in the 2-step random access includes a terminal identity UE ID.

In some embodiments, the data amount indication information is further used to indicate that the terminal is to switch to a Radio Resource Control (RRC) connected state.

Where in response to an uplink grant (UL GRANT), sent by the base station according to the data amount indication information, being received, the remaining data to be transmitted is sent to the base station, includes following steps:
  in response to the UL GRANT sent by the base station being received, switching is performed from the RRC inactive state to the RRC connected state; and
  the remaining data to be transmitted is sent to the base station in the RRC connected state.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

Exemplary embodiments of the present disclosure provide a data transmission apparatus, which can implement all or part of steps executed by the base station in embodiments shown in FIG. 3 or FIG. 4. The data transmission apparatus includes a processor, and a memory for storing instructions executable by the processor.

In some embodiments, the processor is configured to:
  receive, in a random access procedure to the base station initiated by a terminal in a Radio Resource Control (RRC) inactive state, a random access message sent by the terminal;
  send, in response to the random access message containing data amount indication information, an uplink grant (UL GRANT) to the terminal according to the data amount indication information, wherein the data amount indication information is used to indicate amount of remaining data to be transmitted in the terminal; and
  receive the remaining data to be transmitted sent by the terminal according to the UL GRANT.

In some embodiments, an upper limit of a minimum data amount interval indicated by the data amount indication information is less than 10 bytes.

In some embodiments, difference between upper limits of two adjacent data amount intervals among data amount intervals indicated by the data amount indication information is less than or equal to 10 bits.

In some embodiments, the data amount indication information is indicated by a buffer size field in a Buffer Status Report (BSR) in the random access message.

In some embodiments, the data amount indication information is indicated by a Media Access Control layer protocol data unit (MAC PDU) in the random access message.

In some embodiments, the data amount indication information is indicated by an R bit in a header of the MAC PDU.

In some embodiments, the random access message includes Msg3 in 4-step random access or MsgA PUSCH in 2-step random access.

In some embodiments, the Msg3 in the 4-step random access or the MsgA PUSCH in the 2-step random access includes a terminal identity UE ID.

In some embodiments, the data amount indication information is further used to indicate that the terminal is to switch to a Radio Resource Control (RRC) connected state.

According to embodiments of the present disclosure, when data to be transmitted by a terminal is data of small amount, the terminal can send to a base station a random access message with data amount indication information. The base station allocates corresponding radio resources according to the data amount indication information and sends UL GRANT to the terminal. The terminal sends remaining data to be transmitted based on the radio resources received. According to embodiments, a data range corresponding to radio resource allocation in the data amount indication information is small, which enables the base station a more precise resource allocation for the data to be transmitted, thereby avoiding unnecessary waste of resources, and improving the accuracy of resource allocation.

Foregoing embodiments take mainly the terminal and the base station as examples to introduce solutions provided by embodiments of the present disclosure. It can be understood that, in order to realize above-mentioned functions, corresponding hardware structures and/or software modules for executing the functions are included. According to modules and algorithm steps of examples described in embodiments of the present disclosure, those embodiments of the present disclosure can be implemented in hardware or a combination of hardware and computer software. Whether a function is performed by hardware or computer software driving the hardware depends on the specific application and design constraints of a technical solution. Those skilled in the art may use different methods to implement the functions described for each specific application, but such implementation should not be considered beyond the scope of technical solutions of embodiments of the present disclosure.

Figure 9:
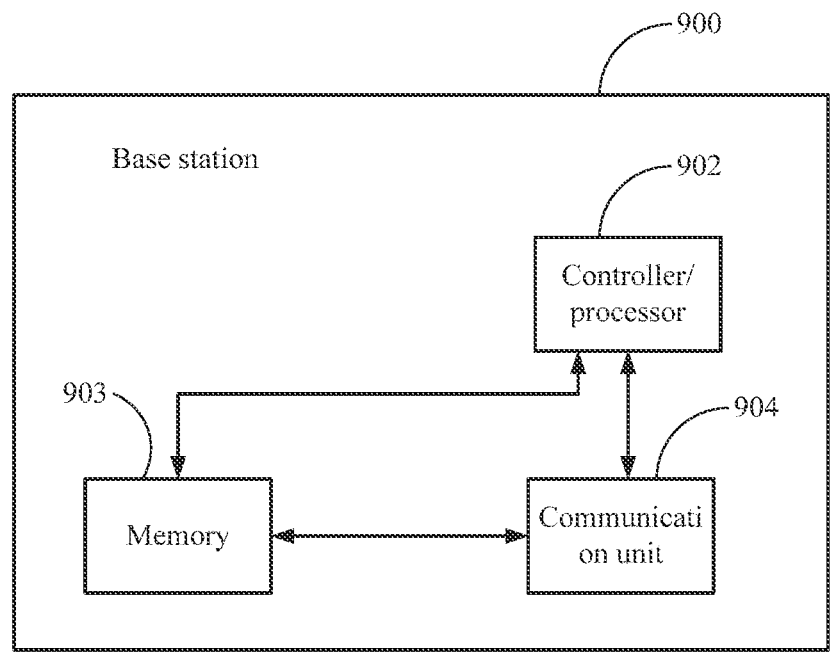
FIG. 9 is a schematic structural diagram of a base station according to an embodiment of the present disclosure.

FIG. 9 is a schematic structural diagram of a base station according to an embodiment of the present disclosure.

As shown in FIG. 9, a base station 900 includes a communication unit 904 and a processor 902. The processor 902 may also be a controller, which is represented as "controller/processor 902" in FIG. 9. The communication unit 904 is used to support communication between the base station and other network devices (e.g., terminals or other base stations, etc.).

The base station 900 may further include a memory 903 for storing program codes and data for the base station 900.

It can be understood that FIG. 9 only shows a simplified design of the base station 900. In practical applications, the base station 900 may include any number of processors, controllers, memories, communication units, etc., and all terminal devices that can implement embodiments of the present disclosure fall within the protection scope of embodiments of the present disclosure.

Figure 10:
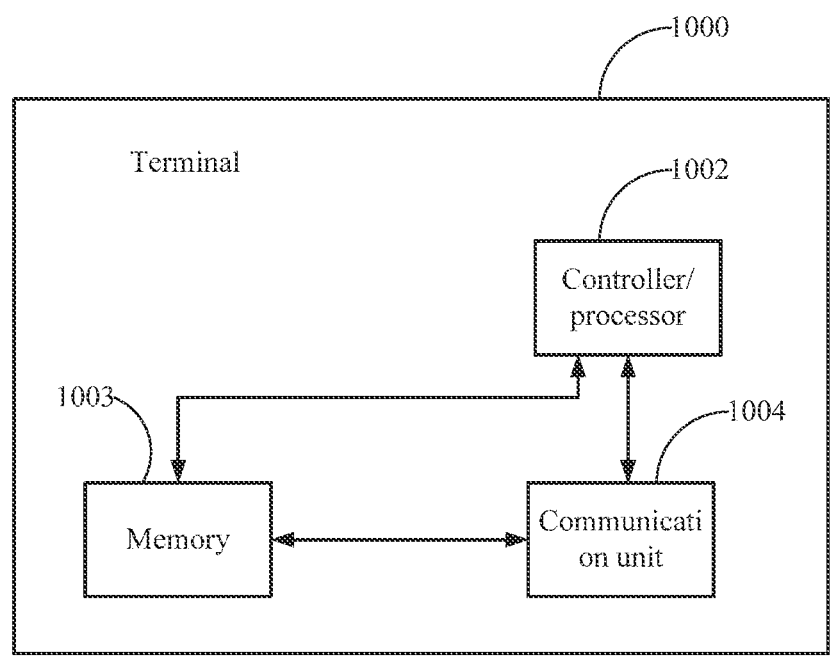
FIG. 10 is a schematic structural diagram of a terminal according to an embodiment of the present disclosure.

FIG. 10 is a schematic structural diagram of a terminal according to an embodiment of the present disclosure.

As shown in FIG. 10, a terminal 1000 includes a communication unit 1004 and processor 1002. The processor 1002 may also be a controller, which is represented as "controller/processor 1002" in FIG. 10. The communication unit 1004 is used to support communication between the terminal and other network devices (e.g., base stations, etc.).

The terminal 1000 may further include a memory 1003 for storing program codes and data for the terminal 1000.

It can be understood that FIG. 10 only shows a simplified design of the terminal 1000. In practical applications, the terminal 1000 may include any number of processors, controllers, memories, communication units, etc., and all terminal devices that can implement embodiments of the present disclosure fall within the protection scope of embodiments of the present disclosure.

Those skilled in the art should recognize that, in one or more of above examples, the functions described in embodiments of the present disclosure may be implemented by hardware, software, firmware, or any combination thereof. When implemented in software, the functions may be stored on or transmitted over as one or more instructions or codes on a computer-readable medium. The computer-readable medium includes a computer storage medium and a communication medium including any medium that facilitates transfer of a computer program from one place to another. The storage medium can be any available medium that can be accessed by a general purpose or special purpose computer.

Embodiments of the present disclosure further provide a computer-readable storage medium, and the computer-readable storage medium contains executable instructions. The executable instructions can be invoked and executed by a processor in a terminal, so as to implement the data transmission method executed by the terminal as described in foregoing method embodiments. The executable instructions can also be invoked and executed by a processor in a base station, so as to implement the data transmission method executed by the base station as described in foregoing method embodiments.

Other embodiments of the present disclosure will readily occur to those skilled in the art upon consideration of the specification and practice of embodiments disclosed herein. The present disclosure is intended to cover any variations, uses, or adaptations of the disclosure that follow the general principles of the present disclosure and include common general knowledge or techniques in the technical field not disclosed by the disclosure. The specification and examples are to be regarded as exemplary only, with the true scope and spirit of the disclosure being indicated by the appended claims.

It should be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A data transmission method, executed by a terminal, comprising:
sending, in a random access procedure to a base station initiated by the terminal in a Radio Resource Control (RRC) inactive state, a random access message to the base station in response to presence of remaining data to be transmitted in the terminal, wherein the random access message contains data amount indication information; and
sending the remaining data to be transmitted to the base station in response to receiving an uplink grant (UL GRANT) sent by the base station according to the data amount indication information, wherein among data amount intervals indicated by the data amount indication information, difference between upper limits of two adjacent data amount intervals is less than or equal to 10 bits.

2. The method according to claim 1, wherein an upper limit of a minimum data amount interval indicated by the data amount indication information is less than 10 bytes.

3. The method according to claim 1, wherein the data amount indication information is indicated by a buffer size field in a Buffer Status Report (BSR) in the random access message.

4. The method according to claim 1, wherein the data amount indication information is indicated by a Media Access Control layer protocol data unit (MAC PDU) in the random access message.

5. The method according to claim 4, wherein the data amount indication information is indicated by an R bit in a header of the MAC PDU.

6. The method according to claim 1, wherein the random access message comprises Msg3 in 4-step random access or MsgA PUSCH in 2-step random access.

7. The method according to claim 6, wherein the Msg3 in the 4-step random access or the MsgA PUSCH in the 2-step random access comprises a terminal identity UE ID.

8. The method according to claim 1, wherein the data amount indication information is configured to indicate that the terminal is to switch to a Radio Resource Control (RRC) connected state; and wherein
sending the remaining data to be transmitted to the base station in response to receiving an uplink grant (UL GRANT) sent by the base station according to the data amount indication information comprises:
switching from the RRC inactive state to the RRC connected state in response to receiving the UL GRANT sent by the base station; and
sending, in the RRC connected state, the remaining data to be transmitted to the base station.

9. A data transmission method, executed by a base station, comprising:
receiving, in a random access procedure to the base station initiated by a terminal in a Radio Resource Control (RRC) inactive state, a random access message sent by the terminal;
sending, in response to the random access message containing data amount indication information, an uplink grant (UL GRANT) to the terminal according to the data amount indication information, wherein the data amount indication information is used to indicate amount of remaining data to be transmitted in the terminal; and receiving the remaining data to be transmitted sent by the terminal according to the UL GRANT; wherein among data amount intervals indicated by the data amount indication information, difference between upper limits of two adjacent data amount intervals is less than or equal to 10 bits.

10. The method according to claim 9, wherein an upper limit of a minimum data amount interval indicated by the data amount indication information is less than 10 bytes.

11. The method according to claim 9, wherein the data amount indication information is indicated by a buffer size field in a Buffer Status Report (BSR) in the random access message.

12. The method according to claim 9, wherein the data amount indication information is indicated by a Media Access Control layer protocol data unit (MAC PDU) in the random access message.

13. The method according to claim 12, wherein the data amount indication information is indicated by an R bit in a header of the MAC PDU.

14. The method according to claim 9, wherein the random access message comprises Msg3 in 4-step random access or MsgA PUSCH in 2-step random access.

15. The method according to claim 14, wherein the Msg3 in the 4-step random access or the MsgA PUSCH in the 2-step random access comprises a terminal identity UE ID.

16. The method according to claim 9, wherein the data amount indication information is configured to indicate that the terminal is to switch to a Radio Resource Control (RRC) connected state.

17. A terminal, comprising:
a processor; and
a memory for storing instructions executable by the processor;
wherein the processor is configured to:
send, in a random access procedure to a base station initiated by the terminal in a Radio Resource Control (RRC) inactive state, a random access message to the base station in response to presence of remaining data to be transmitted in the terminal, wherein the random access message contains data amount indication information; and
send the remaining data to be transmitted to the base station in response to receiving an uplink grant (UL GRANT) sent by the base station according to the data amount indication information; wherein among data amount intervals indicated by the data amount indication information, difference between upper limits of two adjacent data amount intervals is less than or equal to 10 bits.

* * * * *